United States Patent [19]

Postle

[11] 4,369,310
[45] Jan. 18, 1983

[54] BLEACHABLE DYES

[75] Inventor: Stephen R. Postle, Brentwood, England

[73] Assignee: Ciba-Geigy Ltd., Basel, Switzerland

[21] Appl. No.: 199,162

[22] Filed: Oct. 22, 1980

[30] Foreign Application Priority Data

Nov. 19, 1979 [GB] United Kingdom .............. 7939970

[51] Int. Cl.$^3$ ................. C07D 231/22; C07D 487/04
[52] U.S. Cl. .................................. 542/442; 542/445; 542/441; 430/522; 430/518
[58] Field of Search ................. 542/420, 442, 445

[56] References Cited

U.S. PATENT DOCUMENTS

| 3,540,887 | 11/1970 | Depoorter et al. | 542/442 |
| 3,563,748 | 2/1971 | Depoorter et al. | 542/442 |
| 3,615,546 | 10/1971 | Depoorter et al. | 542/442 |
| 3,745,159 | 7/1973 | Reiner et al. | 542/420 |
| 4,234,677 | 11/1980 | Postle | 542/442 |

OTHER PUBLICATIONS

March, "Advanced Organic Chemistry", (McGraw-Hill), (1968), pp. 697–698.

Primary Examiner—Robert T. Bond

Attorney, Agent, or Firm—Joseph G. Kolodny

[57] ABSTRACT

Dyestuffs of the general formula

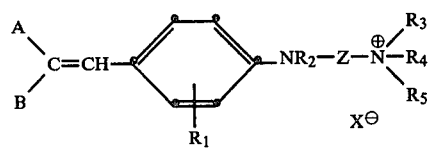

wherein A and B each represent a cyano, acyl or carbalkoxy group save that when A is cyano B cannot be cyano or carbalkoxy, or A and B form together with the carbon atom to which they are attached a carbocyclic or heterocyclic ring system, $R_1$ is hydrogen, alkyl or alkoxy, $R_2$ alkyl, $R_3$, $R_4$, $R_5$ each are hydrogen, alkyl, carboxyalkyl, alkoxy-carbonyl-alkyl or aryl, or two of $R_3$, $R_4$ and $R_5$ or all three $R_3$, $R_4$ and $R_5$ may form together with the nitrogen atom to which they are bonded a ring system, Z is a linking group and $X^\ominus$ an anion.

The dyes can be bleached easily and they are suitable as antihalation or filter dyes in photographic materials.

9 Claims, No Drawings

BLEACHABLE DYES

This invention relates to novel dyestuffs and to their use in photographic material.

According to the present invention there is provided a dyestuff of the general formula

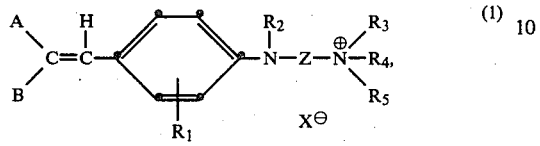

(1)

wherein A and B each represent —CN, —COR$_6$ or —CO$_2$R$_7$ wherein R$_6$ is aryl and R$_7$ is alkyl having 1 to 4 carbon atoms save that when A is —CN, B cannot be —CO$_2$R$_7$ or —CN, or A and B represent together with the carbon atom to which they are attached the atoms necessary to complete an optionally substituted carbocyclic or heterocyclic ring system, R$_1$ is hydrogen, alkyl having from 1 to 4 carbon atoms or alkoxy having from 1 to 4 carbon atoms, R$_2$ is optionally substituted alkyl having from 1 to 4 carbon atoms, R$_3$, R$_4$ and R$_5$ represent hydrogen, alkyl having from 1 to 4 carbon atoms, carboxylalkyl, alkoxycarbonyl alkyl or aryl, or two of R$_3$ to R$_5$ or all three of R$_3$ to R$_5$ may with the nitrogen atoms to which they are attached form a ring system, Z is a linking group —(CHR$_8$)$_m$—(CH$_2$)$_n$ wherein R$_8$ is hydrogen or methyl and m is 0 or 1 and n is 1, 2 or 3 and X$^\ominus$ is an anion.

The substituents A and B and the carbon atom to which they are attached can form 5- or 6-membered, saturated or unsaturated carbocyclic ring systems, which optionally are condensed with a benzene ring and which contain at least one keto group. Further, substituents A and B and the carbon atom to which they are attached can form heterocyclic ring systems. Preferably, these are 5- or 6-membered saturated or unsaturated rings containing 1 or 2 heteroatoms such as nitrogen or sulfur which optionally are condensed with a benzene ring and which contain at least one keto group. It is also possible that saturated or unsaturated bicyclic ring systems having from 8 to 10 ring atoms are formed. At least two of these atoms are heteroatoms such as nitrogen or sulfur. The bicyclic system contains at least 2 keto-groups.

Preferred classes of dyestuff of formula (1) are those wherein A, B and the carbon atom to which they are attached represent one of the following ring systems:

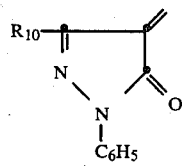

(a)

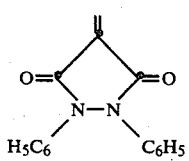

(b)

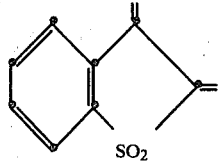

(c)

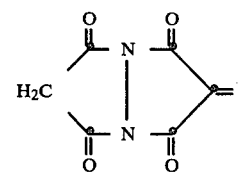

(d)

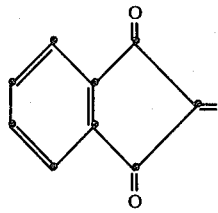

(e)

where R$_{10}$ in the above formulae (a) to (e) is hydrogen or methyl.

Most preferably, A, B and the carbon atom to which they are attached represent an indan-1,3-dione or a Δ$^2$-pyrazolone radical.

A and B each represent —CN, —COR$_6$ or —CO$_2$R$_7$. R$_6$ is aryl such as phenyl or naphthyl, optionally substituted by halogen, preferably chlorine or bromine, lower alkyl (C$_1$–C$_4$), preferably methyl or ethyl, or alkoxy groups such as methoxy, ethoxy or butoxy. Most preferably R$_6$ si phenyl. R$_7$ is alkyl, e.g. methyl, ethyl, propyl or butyl. R$_7$ may be substituted with methoxy or chlorine. When A denotes —CN, B cannot be —CO$_2$R$_7$ or —CN.

A preferred class of dyestuffs of formula (1) are those wherein A is —CN and B is —COR$_6$, wherein R$_6$ has the measuring assigned to it above.

A ring system which includes R$_3$, R$_4$ and R$_5$ and the nitrogen atom to which they are attached is a either a bicyclic or a unsaturated system. These ring systems which can be further substituted by methyl or ethyl groups optionally contain at least one hetero atom, such as nitrogen, oxygen or sulfur. Oxygen is preferred.

It is further possible that only two of the substituents R$_3$, R$_4$ and R$_5$ together with the nitrogen atom to which they are bonded, form a cyclic system. This system, which is saturated or unsaturated, optionally contains at least one hetero atom such as nitrogen, oxygen or sulfur atoms. Oxygen is preferred.

Examples of ring systems including all substituents R$_3$, R$_4$ and R$_5$ and the nitrogen atom to which they are attached or only two of substituents R$_3$, R$_4$ and R$_5$ and the nitrogen atom to which they are bonded are:

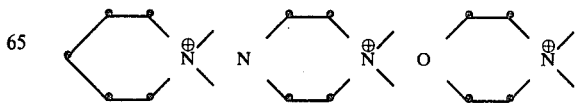

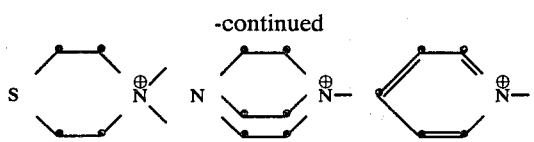

These rings may be substituted with methyl or ethyl groups. Preferably, $R_3$, $R_4$ and $R_5$ together with the nitrogen atom complete a pyridinium ring.

$R_3$, $R_4$ and $R_5$ each represent hydrogen or alkyl having 1 to 4 carbon atoms, e.g. methyl, ethyl, n-propyl, i-propyl, n-butyl, i-butyl or t-buty. Hydrogen, methyl, ethyl and i-propyl are preferred.

$R_3$, $R_4$ and $R_5$ further denote carboxyalkyl wherein alkyl contains 1 to 4 carbon atoms. Carboxymethyl and carboxyethyl are preferred.

Are $R_3$, $R_4$ and $R_5$ a alkoxycarbonyl-alkyl group, the alkoxy radical has from 1 to 4 carbon atoms as well as the alkyl radical. Suitable groups are methoxy- or ethoxycarbonylmethyl or -ethyl, respectively.

$R_3$, $R_4$ and $R_5$ each represent aryl, e.g. phenyl or naphthyl. These radicals may be further substituted by alkyl or alkoxy each having from 1 to 4 carbon atoms or halogen.

A preferred radical is phenyl. This can be substituted with methyl or bromine.

$R_1$ is hydrogen or alkyl having from 1 to 4 carbon atoms. These alkyl groups, e.g. methyl, ethyl, n-propyl, i-propyl, n-butyl and i-propyl are optionally further substituted by halogen such as bromine or chlorine, methoxy, cyano or nitro groups. $R_1$ denotes further those alkoxy radicals which correspond to the alkyl groups defined above, inclusive the substituents.

Preferably, $R_1$ is hydrogen, methyl, ethyl and methoxy. Most preferably $R_1$ is hydrogen.

$R_2$ is alkyl having from 1 to 4 carbon atoms, e.g. methyl, ethyl, propyl or butyl. These radicals may be substituted by chlorine, bromine or methoxy. Preferably $R_2$ is methyl or ethyl. Further most preferably $R_3$ is hydrogen or methyl and $R_4$ and $R_5$ are each ethyl.

Z is a linking group of the alkylene type, e.g. methylene, ethylene, propylene, butylene, pentylene or i-pentylene. Preferably Z is methylene or ethylene. Most preferably Z is ethylene.

$X^\ominus$ denotes a halogen ion such as chlorine or bromine. Further $X^\ominus$ is an anion of an alkyl sulphate, preferably methyl sulphate.

Compounds of formula (1) may be prepared by reacting an active methylene group containing compound of the formula $A-CH_2-B$ wherein A and B have the meanings assigned to them above with a benzaldehyde of the general formula

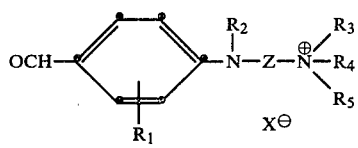

wherein $R_1$, $R_2$, $R_3$, $R_4$, $R_5$, Z and $X^\ominus$ have the meanings assigned to them above in a polar solvent at reflux temperature.

An example of a suitable polar solvent is acetic acid.

When $R_3$ is hydrogen a benzaldehyde of the general formula

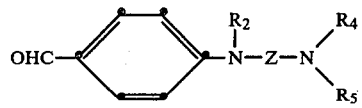

wherein $R_1$, $R_2$, $R_4$, $R_5$ and Z have the meanings assigned to them above may be used, $H^\oplus X^\ominus$, wherein $X^\ominus$ has the meaning assigned to it above, may then be added during purification to form the compound of formula (1).

The benzaldehydes of formula (2) and (3) may be prepared using known methods.

Form example using a substituted aniline via the process:

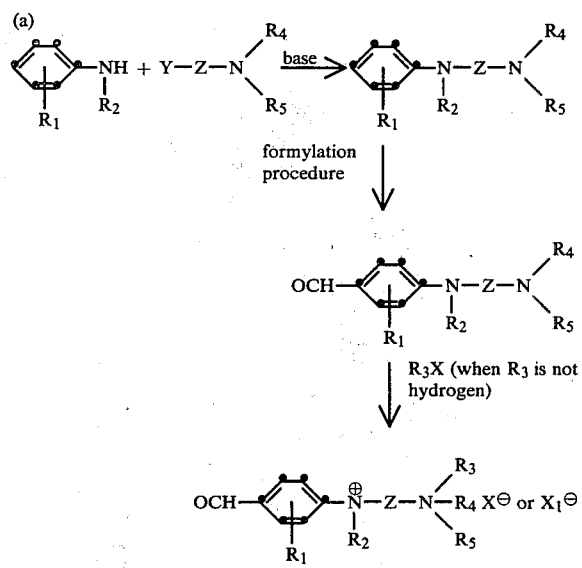

Or using a trialkylamine:

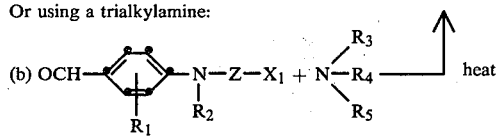

where in the above scheme $R_1$, $R_2$, $R_3$, $R_4$, $R_5$, Z and $X^\ominus$ have the meanings assigned to them above, Y is a leaving group and $X_1$ is a halogen atom such as chlorine or bromine.

A suitable formylation procedure is that of Vilsmeier and Haak as described in U.S. Pat. No. 2,141,090 and in "Berichte der Deutschen Chemischen Gesellschaft" 1928, 60, 119.

Route (b) is described in U.S. Pat. Nos. 3,141,018 and 3,247,215.

The dyestuffs of the present invention are of use as dyes in photosensitive material which are not required to be present in the exposed and processed material. The dyestuffs of the present invention thus are useful as antihalation dyes, filter dyes and as acutance dyes.

The dyestuffs of the present invention are useful in such functions because:

they are fully bleached by the processing procedure, especially by the sulphite in developer solutions, without subsequent regeneration of the dye in the photographic assembly, they are easily formulated, in general being water-soluble. The majority of them display controllable and beneficial aggregation in gelatin layers. This has the effect of:

increasing the visible spectral coverage of the dyes, owing to the emergence of absorption peaks ascribable to the aggregated species, and rendering the dyes excellently substantive in gelatin layers, without adversely affecting their bleachability.

In instances where aggregation (as adjudged by spectral coverage) does not occur (e.g. examples K and L below) substantivity is greatly reduced.

They possess the ability to mordant anionic dyes, which are not of themselves very substantive in gelatin. An underlayer assembly containing one of the dyes of this invention and an anionic dye often display absorption maxima which are not due to the presence of either dye singly in the layer, and may be between, or outside of, the absorption maxima normally displayed by the dyes in gelatin.

Therefore according to another aspect of the present invention there is provided photographic material which comprises in at least one layer thereof a dyestuff of formula (1). The layer which contains the dyestuff may be for example an antihalation underlayer, an antihalation backing layer or a filter layer in photographic material. When the layer is an antihalation underlayer or a filter layer the binder for the layer will usually be gelatin but when the layer is an antihalation backing layer this layer may be a resin backing layer.

A gelatin based antihalation underlayer also comprises an anionic antihalation dyestuff.

The following preparations serve to illustrate the preparation of intermediates used in the dyestuff synthesis Examples which follow.

Preparations (1) N-[2'-(N'-Piperidyl)ethyl]-N-methylaniline 36,8 g ($2 \times 10^{-1}$ mol) of N-2'-chloroethyl piperidine are stirred with 10 g of sodium hydroxide in 100 ml of water. The mixture is extracted with $3 \times 50$ ml of ether and the extracts dried and evaporated. The residue is heated under reflux with 21,4 g ($2 \times 10^{-1}$ mol) of N-methylaniline in 25 ml of 2-methoxyethanol for 4 hours. About 20 ml of solvent is distilled off and the residue cooled to yield a cake. This is taken up in 100 ml of water and washed with 100 ml of ether to remove tarry material. The aqueous portion is treated with 10 g of sodium hydroxide and the separating oil extracted with $2 \times 25$ ml of ether. The ether extracts are dried and evaporated to yield 25.5 g of a brown oil. Distillation afforded a fraction of 22.3 g (51%), of the title compound (boiling point 135°–136° C./2 mm Hg).

Similarly prepared are:

(2) N-[2'-(dimethylamino)ethyl]-N-methylaniline (b.p. 87°–89° C./0,65 mbar)

(3) N-[2'-(diethylamino)ethyl]-N-ethylaniline (b.p. 119°–120° C.0,52 mbar)

(4) N-[2'-morpholino)ethyl]N-methylaniline (b.p. 158°–160° C.0,13 mbar)

(5) N-[2'-(di-2'-propylamino)ethyl]N-methylaniline (b.p. 116°–118° C./0,13 mbar)

(6) N-[2'-diethylamino)ethyl]N-methylaniline (b.p. 130°–133° C./1,95 mbar).

(The reaction may also be performed in one step from the appropriate haloalkylamine hydrohalide and aniline with the stoichiometric amount of sodium hydroxide present).

(7) N-[2'-(N'-Piperidyl)ethyl]N-methylaniline-4-carboxaldehyde.

21.8 g ($10^{-1}$ mol) of Compound 1 in 20 ml of dimethylformamide is maintained in an ice bath such that 10° C.$<T<20°$ C. whilst 11 ml ($2.4 \times 10^{-1}$ mol) of fresh phosphorous oxychloride is added dropwise over 1 hour. The mixture is then heated on a steam bath and stirred for 1½ hours, and cooled to a glass. This is dissolved out in 18 g of sodium hydroxide in 140 ml of water with warming. The mixture is extracted with $2 \times 100$ ml of dichloromethane and the organic extracts washed with water (100 ml), dried and evaporated to yield, a brown liquid. Distillation afforded a fraction of 15.5 g (63%) of the title compound (boiling point 195°–198° C./0,5 mm Hg).

Similarly prepared are:

(8) N-[2'-(dimethylamino)ethyl]N-methylaniline-4-carboxaldehyde (b.p. 161°–163° C./0,65 mbar), (9) N-[2'-(diethylamino)ethyl]N-ethylaniline-4-carboxaldehyde (b.p. 198°–200° C./0,52 mbar),

(10) N-[2'-(N'-morpholino)ethyl]N-methylaniline-4-carboxaldehyde (b.p. 228°–232° C./1,3 mbar),

(11) N-[2'-(di-2''-propyl)ethyl]N-methylaniline-4-carboxaldehyde (b.p. 200°–202° C./1,04 mbar),

(12) N-[2'-(diethylamino)ethyl]N-methylaniline-4-carboxaldehyde (b.p. 210°–212° C./0,52 mbar).

(13) N-[2'-(N',-{N'-methylpiperidinium})ethyl]-N-methylaniline-4-carboxaldehyde methylsulphate 6.15 g ($2.5 \times 10^{-2}$ mol) of Compound 7 and 2.4 ml ($2.5 \times 10^{-2}$ mol) of dimethylsulphate are stirred in 25 ml of toluene at 50° C. for 1 hour. Upon cooling a green gummy solid separates. This is washed with ether, and purified by column chromatography (methanol/silica gel) to yield 6.88 g (74%) of a yellow oil identified as the title compound.

Similarly prepared are:

(14) N-[2'-(N'-{'-ethoxycarbonylmethylpiperidinium}ethyl]-N-methylaniline-4-carboxaldehyde bromide (yellow gum)

(15) N-[2'-(dimethylethylammonium)ethyl]N-methylaniline-4-carboxaldehyde ethyl sulphate (yellow gum)

(16) N-[2'-N'{N'-methylmorpholino})ethyl]N-methylaniline-4-carboxaldehyde methyl sulphate (yellow gum)

(17) N-(2'-N'-Pyridinivmethyl)ethylaniline-4-carboxaldehyde chloride 21.15 g ($10^{-1}$ mol) of 4-(N-2-chloroethyl N-ethylamino)benzaldehyde and 105 ml of pyridine are heated under reflux for 24 hours. The mixture is cooled and diluted with ether. The precipitated product is washed well with ether and dried in vacuo to yield 27.0 g (77%) of the title compound (melting point 132°–135° C.).

Similarly prepared is: p0 (18) N-(2'-triethylammoniumethyl)ethylaniline-4-carboxaldehyde chloride (m.p. 236°–238° C.).

The structures of Compounds (7) to (18) are as follows:

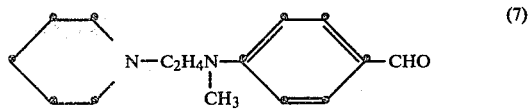

(7)

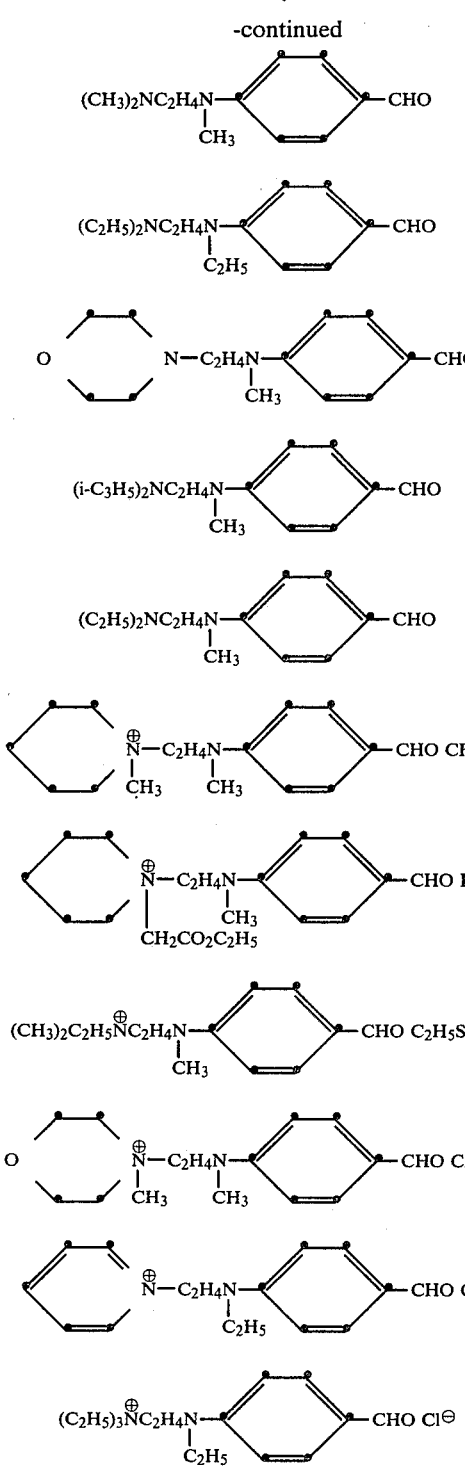

EXAMPLE 1

Preparation of dyestuffs according to the invention:

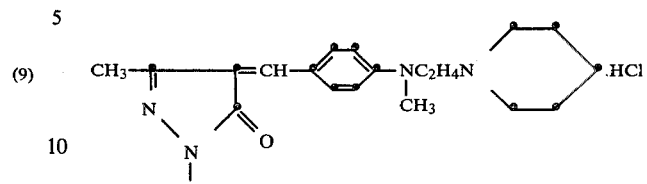

0,46 g of 3-Methyl-1-phenyl-$\Delta^2$-pyrazolin-5-one and 0,62 g of intermediate 7) are heated at reflux in 2,5 ml of acetic acid for 30 minutes. The mixture is cooled and drowned in ether. The red oil is treated with 5 ml of ethanol and 0,25 ml of conc. hydrochloric acid and drowned once more in ether, to give 1,01 g of a red solid $\lambda$max (MeOH) 469 nm, ($\epsilon = 2.54 \times 10^4$).

Similarly prepared from (7) is:

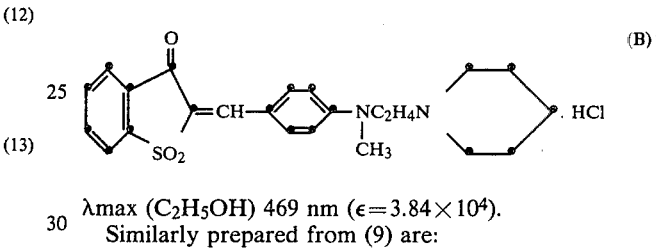

$\lambda$max ($C_2H_5OH$) 469 nm ($\epsilon = 3.84 \times 10^4$).

Similarly prepared from (9) are:

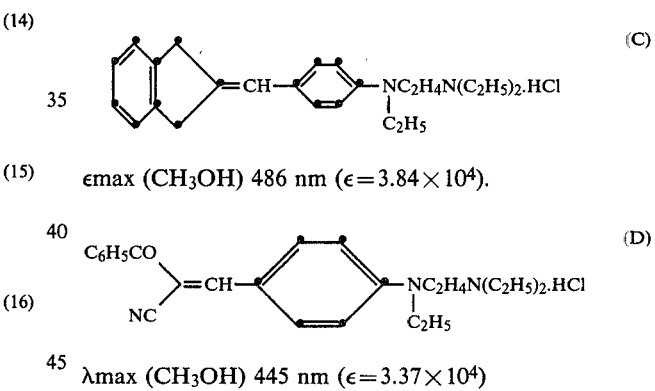

$\epsilon$max ($CH_3OH$) 486 nm ($\epsilon = 3.84 \times 10^4$).

$\lambda$max ($CH_3OH$) 445 nm ($\epsilon = 3.37 \times 10^4$)

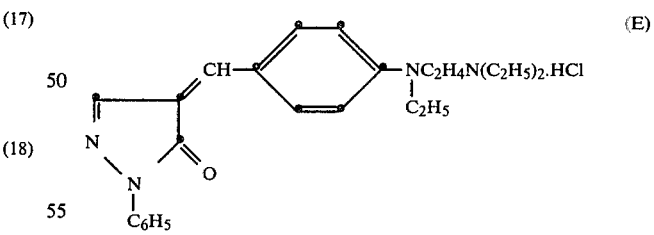

$\lambda$max ($CH_3OH$) 455 nm ($\epsilon = 1.71 \times 10^4$)

Similarly prepared from intermediate (10) is:

The following Examples will serve to illustrate the invention.

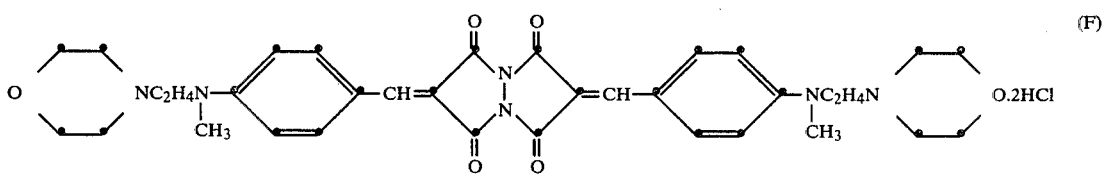

λmax (CH₃OH) 534, 465 nm ($\epsilon_{534}=3.47\times10^4$, $\epsilon_{465}=1.19\times10^4$)

Similarly prepared from intermediate (11) is:

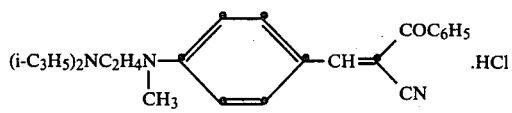
(G)

λmax (CH₃OH) 437 nm ($\epsilon=2.46\times10^4$).

Similarly prepared from intermediate (12) is:

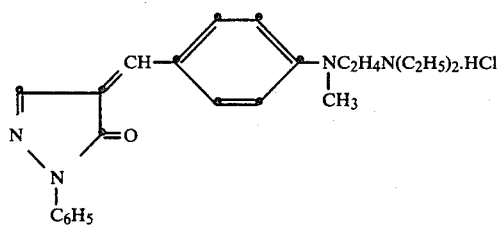
(H)

λmax (CH₃OH) 480 nm ($\epsilon=3.75\times10^4$)

(I)

λmax (CH₃OH) 443 nm ($\epsilon=4.99\times10^4$)

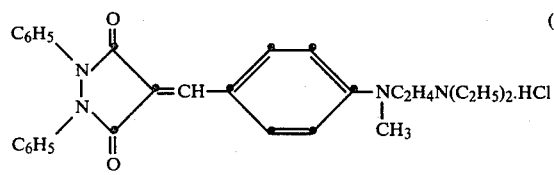
(J)

λmax (CH₃OH) 467 nm ($\epsilon=7.77\times10^4$)

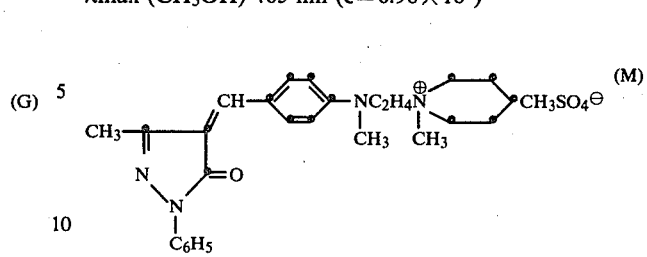
(K)

0,44 g of 3-Hydroxy-1-phenyl-Δ²-pyrazolin-5-one and 0,93 g of intermediate (13) are heated at reflux in 2,5 ml of acetic acid for 30 minutes. The mixture is cooled, drowned in ether, and the precipitated oil washed with acetone, then ground under ether to yield 1.32 g of an orange solid (λmax (CH₃OH) 466 nm, $\epsilon=6.84\times10^4$).

Similarly prepared from intermediate (13) are:

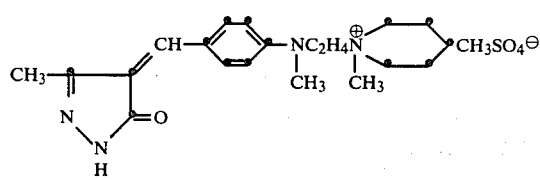
(L)

λmax (CH₃OH) 465 nm ($\epsilon=6.98\times10^3$)

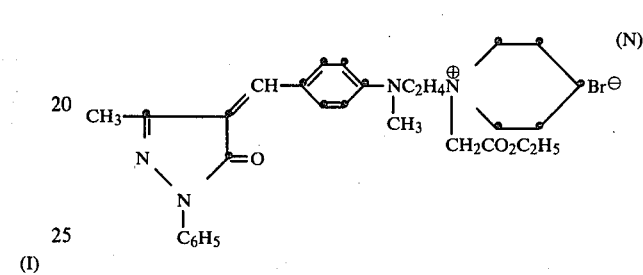
(M)

λmax (CH₃OH) 464 nm ($\epsilon=3.85\times10^4$)

Similarly prepared from intermediate (14) is:

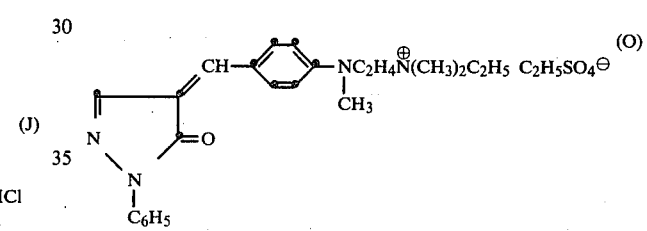
(N)

λmax (CH₃OH) 461 nm ($\epsilon=2.39\times10^4$)

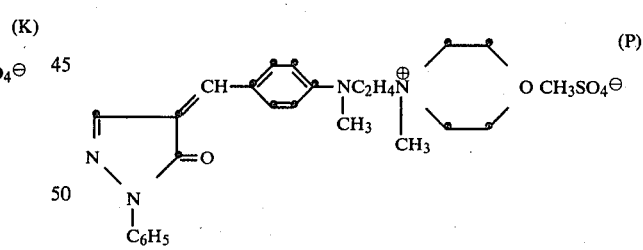
(O)

λmax (CH₃OH) 475 nm ($\epsilon=2.68\times10^4$)

Similarly prepared from intermediate (16) is:

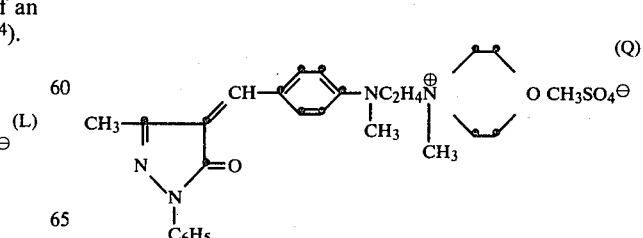
(P)

λmax (CH₃OH) 450 nm ($\epsilon=1.45\times10^4$)

Similarly prepared from intermediate (17) are:

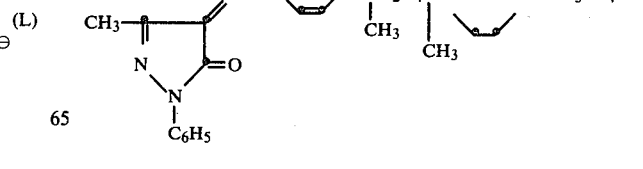
(Q)

λmax (CH₃OH) 450 nm ($\epsilon=1.45\times10^4$)

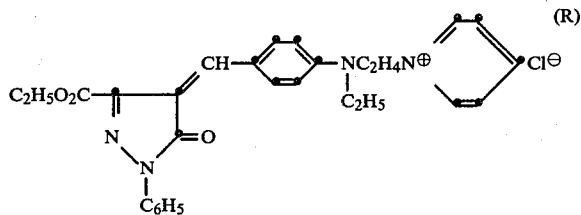

$\lambda$max (CH$_3$OH) 455 nm ($\epsilon$=2.71×10$^4$)

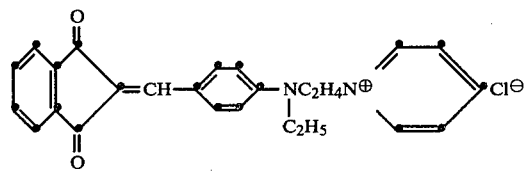

$\lambda$max (CH$_3$OH) 469 nm ($\epsilon$=5.06×10$^4$)

EXAMPLE 2

Use Example

Dyed coated gelatin layers were prepared as follows:

| Stock Solutions: | | |
|---|---|---|
| 6% Gelatin | Gelatin | 6 g |
| | Distilled water | 94 ml |

Swell as room temperature for 30 minutes and then dissolve at 60° C. Adjust to 40° C.
Dyestuff—2.5×10$^{-3}$ molar Dissolve 0.25 mMol of the dyestuff in 10 ml of water or 2-ethoxyethanol Adjust solution to 40° C.
Hardener—1%

Dissolve 100 mg of a triazine-type hardener in 10 ml of water. Adjust solution to 40° C.
Wetting Agent—5% neutral or anionic wetting agent
Coating Solution
  Gelatin stock solution: 3.5 ml
  Distilled water: 5.0 ml
  Wetting agent: 0.25 ml
  Dyestuff: 0.232 ml
  Hardener: 1.0 ml Coat at 40° C. on plates affixed with triacetate base and allow to set for 5 minutes on a cold plate ($\simeq$10° C.). Dry at room temperature.
  Gel coating weight: 91.3 mg/dm$^2$
  nMol Dye/100 g gel: 7.76
  Dye coatin weight: 0.0025 mMol/dm$^2$ Nineteen samples are prepared from dyes A to S.
Substantivity Measurement A 5 cm$^2$ disc is cut and the visible spectrum measured. The disc is soaked in 7.5 ml of water for 30 minutes. The disc is allowed to dry and the spectrum measured again.

$$\text{Substantivity} = \frac{D \text{ max of soaked disc}}{D \text{ max of unsoaked disc}} \times 100$$

And then to a bleachibility measurement as follows:
Bleachability Measurement

A strip 1″×3″ is immersed for 2.5 minutes in developer, 2 minutes in fix, and washed 10 minutes in water before drying.

$$\text{Bleachability} = 100 \left( 1 - \frac{D \text{ max of bleached strip}}{D \text{ max of unbleached strip}} \right)$$

The developer used comprises per 1000 ml 2 g of metol, 75 g of sodium sulphite (anhydrous), 8 g of hydroquinone, 37.5 g of sodium carbonate (anhydrous) and 2 g of potassium bromide.

The fixer used comprises 82 g of ammonium thiosulphate per 100 ml.

The following results are obtained:

TABLE 1

| Dye | $\lambda$max (coating in gelatin) | substantivity % | bleachability % |
|---|---|---|---|
| A | 415 | 98 | 100 |
| B | 469 | 43 | 99 |
| C | 485 | 61 | 96 |
| D | 445 | 57 | 96 |
| E | 467 | 94 | 100 |
| F | 477 | 80 | 100 |
| G | 444 | 50 | 100 |
| H | 462 | 67 | 100 |
| I | 441 | 44 | 100 |
| J | 471 | 81 | 100 |
| K | 459 | 46 | 100 |
| L | 461 | 43 | 100 |
| M | 421 | 89 | 100 |
| N | 448 | 66 | 100 |
| O | 465 | 46 | 100 |
| P | 466 | 57 | 98 |
| Q | 451 | 78 | 100 |
| R | 473 | 61 | 100 |
| S | 485 | 67 | 99 |

EXAMPLE 3

Showing mordant effect of dyestuff according to this invention when present together with an anionic dyestuff.

(a) Stock solutions are made as follows:
Dye D—0.25 mMols in 10 ml H$_2$O
Dye T—0.25 mMols in 10 ml H$_2$O
(dye T is bis(1-butyl-3-cyano-6-hydroxy-4-methylpyrid-2-one) trimethine oxonol triethylamine salt - ex. B.P. no. 1278621).

The two stock solutions are used as follows to make a coating solution (other components are prepared as in Example 2):
  Gelatin stock solution: 3.5 ml
  Wetting agent: 0.25 ml
  Hardener: 1.0 ml
  Dye D solution: 0.232 ml
  Dye T solution: 0.232 ml
  Distilled water: to 10 ml The solution is coated and processed as in Example 2.

(b) As for (a), save that a solution of dye E (0.25 mMols in 10 ml water—0.232 ml) is used instead of the solution of dye D.

(c) As for (a), save that dye T is coated alone (0.232 ml).

The results are shown in table 2.

TABLE 2

| Coating | light absorption maxima in gelatin (nm) | substantivity % | Overall bleachability % |
|---|---|---|---|
| a | 440, 620 | 85($\lambda$440) 100($\lambda$620) | 100 |

TABLE 2-continued

| Coating | light absorption maxima in gelatin (nm) | substantivity % | Overall bleachability % |
|---|---|---|---|
| b | 480, 620 | 98(λ480) 86(λ620) | 100 |
| c | 608 | 44 | 99 |

This shows that the substantivity of dye T and also the substantivity of dye D have been greatly increased.

The overall light absorption of the dyed layer has been greatly extended to produce a wide absorption band antihalation layer. Thus by using a mixture of the dyestuffs of this invention and a dyestuff of B.P. 1278621, both of which exhibit inadequate substantivity, a useful dyed layer can be otained.

I claim:

1. A dyestuff of the formula

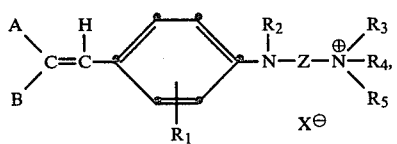
(1)

wherein A and B represent together with the carbon atom to which they are attached the atoms necessary to complete a ring system of the formula

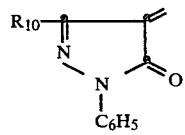
(a)

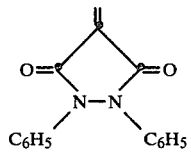
(b)

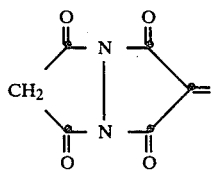
(d)

where in the above formula (a) $R_{10}$ is hydrogen or methyl, $R_1$ is hydrogen, alkyl having from 1 to 4 carbon atoms or alkoxy having from 1 to 4 carbon atoms, $R_2$ is alkyl having from 1 to 4 carbon atoms, which is unsubstituted or substituted by chlorine, bromine or methoxy, $R_3$, $R_4$ and $R_5$ each represent hydrogen, alkyl having from 1 to 4 carbon atoms, carboxyalkyl or alkoxycarbonylalkyl wherein each alkyl radical and the alkoxy radical have from 1 to 4 carbon atoms, naphthyl or phenyl, or two of $R_3$ to $R_5$ or all three of $R_3$ to $R_5$ may with the nitrogen atoms to which they are attached form a ring system of the formula

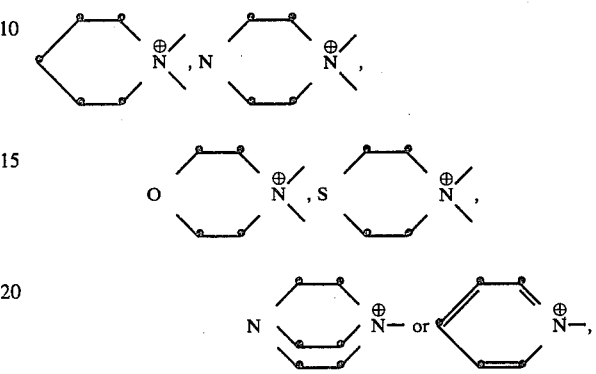

$Z$ is a linking group $-(CHR_8)_m-(CH_2)_n-$ wherein $R_8$ is hydrogen or methyl and m is 0 or 1, n is 1, 2 or 3 and $X^\ominus$ is a halide or methyl sulphate.

2. A dyestuff according to claim 1 wherein A and B and the carbon atom to which they are attached represent a $\Delta^2$-pyrazolone ring.

3. A dyestuff according to claim 1 wherein $R_3$ is hydrogen or methyl and $R_4$ and $R_5$ are each ethyl.

4. A dyestuff according to claim 1, wherein $R_1$ is hydrogen, methyl, ethyl or methoxy.

5. A dyestuff according to claim 4 wherein $R_1$ is hydrogen.

6. A dyestuff according to claim 1 wherein $R_2$ is methyl or ethyl.

7. A dyestuff according to claim 1 wherein Z is the linking group $-CH_2-CH_2-$.

8. A dyestuff according to claim 1 having the formula

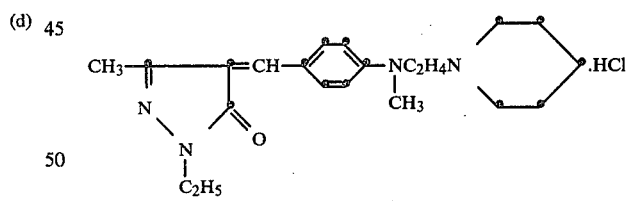

9. A dyestuff according to claim 1 wherein $R_3$, $R_4$, $R_5$ and the nitrogen atom to which they are attached represent a pyridinium ring.

* * * * *